UNITED STATES PATENT OFFICE.

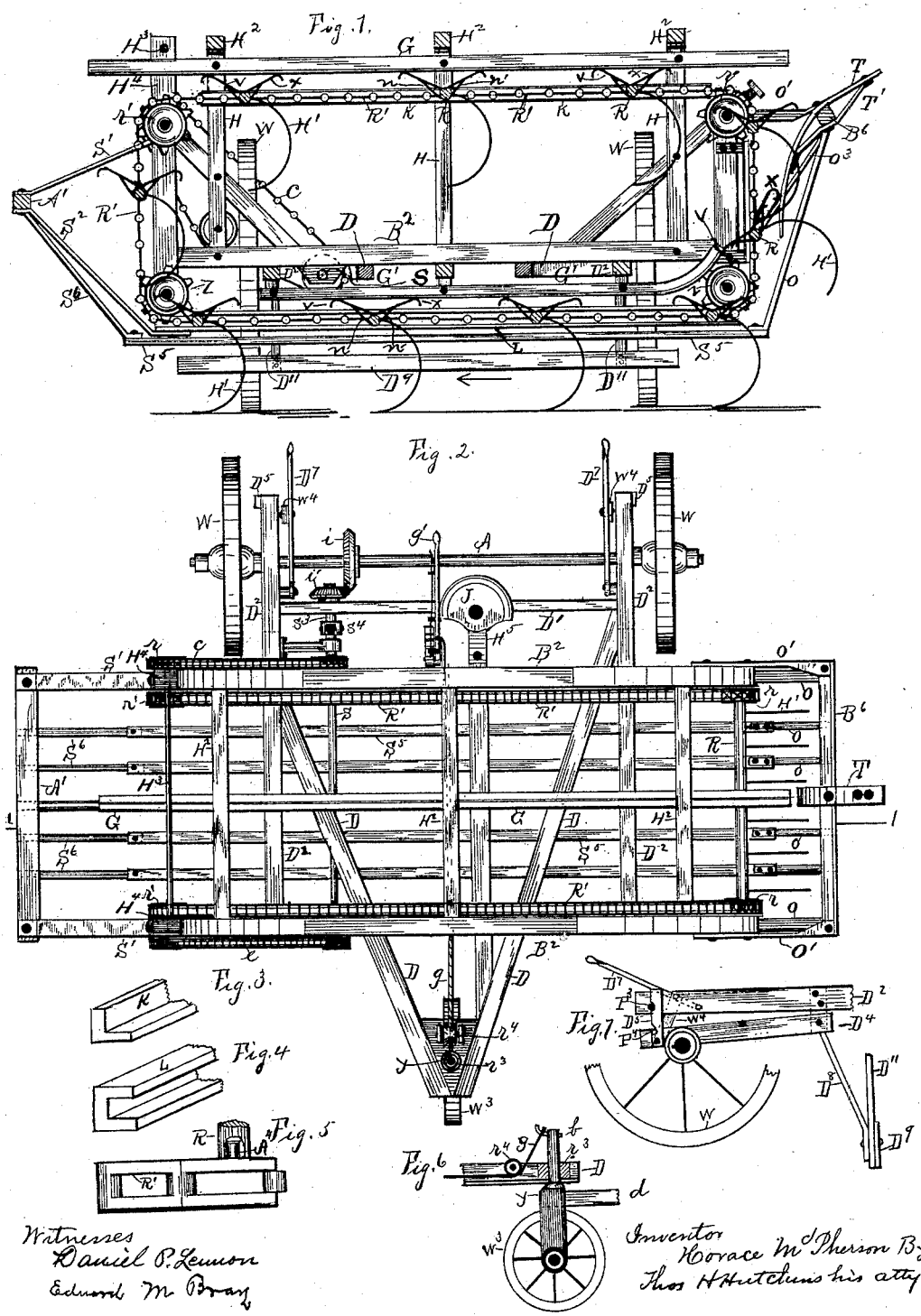

HORACE McPHERSON, OF CRETE, ILLINOIS.

SIDE-DELIVERY HORSE HAY-RAKE.

SPECIFICATION forming part of Letters Patent No. 476,961, dated June 14, 1892.

Application filed February 17, 1892. Serial No. 421,835. (No model.)

*To all whom it may concern:*

Be it known that I, HORACE MCPHERSON, a citizen of the United States of America, residing at Crete, in the county of Will and State of Illinois, have invented certain new and useful Improvements in Side-Delivery Horse Hay-Rakes, of which the following is a specification, reference being had therein to the accompanying drawings, and the letters of reference thereon, forming a part of this specification, in which—

Figure 1 is a vertical longitudinal section on line 1 of Fig. 2. Fig. 2 is a top plan view of the machine. Fig. 3 is a perspective view of a section of one of the upper sprocket-chain guides. Fig. 4 is a perspective view of a section of one of the lower sprocket-chain guides. Fig. 5 is a plan view of a section of one of the sprocket-chains, showing an integral side stud and a section of a rake-head, showing its means of attachment to the sprocket-chain. Fig. 6 is a side view of the front caster-wheel of the machine and of a portion of the frame of the machine to which it attaches, and a central vertical section of the box through which the shank of the caster-wheel fork passes and turns, and Fig. 7 is a side view of the rear end of one of the beams of the frame and of the mechanism for vertically adjusting it on the rear axle of the machine.

This invention relates to certain improvements in side-delivery horse hay-rakes of the class wherein the hay is raked to one side of the machine to form a windrow by means of rakes carried across the path of the machine as it advances, and is intended to be for certain improvements in a rake of a similar character for which Letters Patent No. 431,171, dated July 1, A. D. 1890, were issued by the United States of America to me.

The improvements in this invention relate principally to the means for preventing hay from passing upward into the frame of the machine and for stripping the hay from the teeth as they leave the windrow, and also in the means for elevating and lowering the machine on its axles, so as to permit it to be transported from one place to another without raking.

Referring to the drawings, the main frame is supported on the rear traveling wheels W W and a caster-wheel $W^3$. In front a tongue $d$ attaches to the rotatable frame Y of the caster-wheel.

$D^2$ and D are the bed-sills of the frame. The sills D converge and unite at their forward ends and rest on the caster-wheel $W^3$, and attach at their rear ends to the inner sides of the sills $D^2$ near their rear ends.

$D'$ is a cross-beam for connecting the short sills $D^4$ near their point of pivot with sills $D^2$, so that the shaft $S^3$, boxed to said cross-beam and bearing the pinion $i'$, will not be thrown out of mesh with gear $i$ when the main frame is vertically adjusted, which is permitted by the universal joint $S^4$ connecting shaft $S^3$ with shaft $S'$.

$H^5$ is a sill for supporting on its rear end the driver's seat J.

$B^2$ are cross-sills resting on the sills D, and also having secured to them on their under sides the sills $D^2$ to secure them in place.

H are vertically-arranged posts that are attached to sills $B^2$, one near each end and one at about the center. These posts are connected across the top of the machine by means of cross-bars $H^2$ to hold the sides of the machine-frame together, and also form a support for the upper guide-rail G for holding the rakes in position.

$H^3$ is a tie-rod for connecting the top of the posts $H^4$, to which sprocket-wheels $r'$ are studded, for the purpose of preventing said posts from spreading apart and let the sprocket-chains off of said sprocket-wheels.

A is the axle of the traveling wheels W W, which are intended to be provided with ordinary ratchet-hubs, so that the wheels may rotate the axle forward, but not backward. The said axle turns in suitable boxes on the under rear ends of the beams $D^4$, which are pivotally connected to the rear under side of the sills $D^2$, as shown more particularly in Fig. 7. The said axle is provided with the bevel-gear $i$ for meshing with the bevel-pinion $i'$ on the drive-shaft S, from which drive-shaft the endless sprocket-chains $R'$ are driven through the medium of the sprocket-chains $c\ e$.

$R'\ R'$ are a pair of endless sprocket-chains arranged in the frame across the path of the machine and carry a series of rake-heads R, having curved spring rake-teeth $H'$. These sprocket-chains pass, respectively, over the sprocket-wheels $r'$ $r'$ and Z Z, located on stud-axles secured to the main frame. The upper parts of said chains are supported by and travel on the guideways K, and their lower parts are supported by and travel in the grooved guideways L. These guides K are secured to the posts H on their inner sides, and the guides L are secured to the under side of the sills $D^2$. The upper guides K are formed, preferably, of angle-iron arranged so that the sprocket-chains R' rest and travel on their horizontal part. The lower guideways L are formed with a longitudinal groove, in which the sprocket-chains rest and travel, the upper flange of said groove serving to hold the rakes down to their work. The said sprocket-chains are provided on their inner sides at suitable intervals with the extending studs $A^4$, as shown in Fig. 5. These studs are for the purpose of supporting the rake-heads R by means of said studs being journaled in the ends of the rake-heads, as shown in said figure, and in such manner that the rake-heads may partially rotate on said studs.

The rake-heads are provided with ordinary curved spring-rake teeth, secured thereto by being coiled thereon or in any other suitable manner. The rake-heads are all provided about centrally on their upper side with the extending arms X V. These arms are curved slightly downward at their extending ends and are supported by means of braces $n$ $n'$, secured, respectively, at their outer ends to said arms on their under side, and the said arms and braces are secured to the rake-heads by means of a bolt or rivet passing through them and the rake-head.

G is a guide-rail secured in the top of the machine to the under side of the cross-beams $H^2$ and directly above and over the arms V X on the rake-heads, which arms engage said rail on its under side for the purpose of holding the rakes in proper position and preventing their swinging motion while traversing the machine. G' is a similar guide-rail secured parallel with and below guide-rail G to the under side of bed-sills $D^2$ immediately above arms V X of the rake-heads, which arms engage said rail for the purpose of holding the rakes to their work as they move across the machine.

A' is a cross-bar secured to the delivery end of the machine by means of the braces S' and $S^2$ and is for the purpose of supporting the rear ends of a series of guide-bars $S^5$ through the medium of the braces $S^2$. $B^6$ is a similar cross-bar secured to the opposite end of the machine by means of the braces O' and $O^3$ and supports the opposite end of the guide-bars $S^5$ through the medium of the braces O. Said cross-bar $B^6$ has also secured to it the curved guide T in such position as to be engaged by the extending ends of arms X of the rake-heads in the downward passage of the rakes and retain such engagement until the arms V of the rake-heads are conducted under the extending upturned end of the guide-rail G', as shown in Fig. 1; otherwise arm V would pass over or strike the end of said rail and prevent the operation of the machine. These guide-bars $S^5$ are arranged immediately below and parallel with the frame of the machine and at regular distance apart from each other in such manner that the teeth of the rakes may pass down between them and are for the purpose of preventing the hay from passing upward into the frame of the machine and serve in conjunction with the braces $S^2$ to strip the hay from the rake-teeth as the rakes are carried upward and from between the guide-bars $S^5$ at the delivery end of the machine. The endless sprocket-chains R' and their rakes are driven from axle A of the traveling wheels W W through the medium of bevel-gears $i'$ $i'$, shafts S and $S^3$, connected by the coupling $S^4$, sprocket-chains $c$ and $e$ and their sprocket-wheels, sprocket-wheels $r'$, bearing the endless sprocket-chains R', and sprocket-wheel $r$. Any other suitable means may be used, however, to drive said endless sprocket-chains R'.

In order to adapt the machine to be vertically adjusted, so it can travel from place to place, it is provided at its rear end with the beams $D^4$, pivotally connected at their forward ends to the under side of sills $D^2$, and to which beams $D^4$ the axle A is journaled, as shown in Fig. 7. The sills $D^2$ have pivotally connected to them at one side and near their outer ends the levers $D^7$, which are fulcrumed on the extending ends of arms $W^4$, having their lower ends pivoted to beam $D^4$. Beams $D^4$ have also pivotally connected to their sides, near their outer ends and opposite arms $W^4$, arms $D^5$, having a row of notches $P^4$ for respectively receiving the pin $P^3$, set in the side of sills $D^2$. By operating the levers $D^7$ the sills $D^4$ may be vertically adjusted and maintained in the required position by means of said notched arms and pins, so that the rear end of the machine may be elevated or lowered to adapt it to its work or permit it to be transported from place to place.

In order to vertically adjust the forward end of the machine, the shank of the forked frame Y of the caster-wheel $W^3$ is adapted to have vertical movement in box $r^3$. Its upper end is provided with a hook $b$, which is connected by means of a cord $g$ with a segment hand-lever $g'$, attached to the rear of the machine by the side of the driver's seat J, as shown in Figs. 1 and 6. Said cord passes under a pulley $r^4$ at the side of said box $r^3$, so that by operating said lever $g'$ the forward end of the machine may be elevated and lowered and maintained at the height desired for the purpose specified for elevating and lowering the rear end of the machine.

$D^9$ is a guard-board arranged near the ground under the machine and across its path immediately at the rear of the rakes, and is for the purpose of preventing hay from falling out from between the rakes as the machine advances and enables the rake to carry all the hay to the windrow without loss. This guard-board is secured to the machine by means of the braces $D^8$ and $D^{11}$. (Shown particularly in Fig. 7.)

The new features designed to be described and claimed in this invention relate more particularly to the use of the guide-bars $S^5$, guard-board $D^9$, and the means for vertically adjusting the machine.

In operation as the machine advances the sprocket-chains bearing the rakes are driven so as to cause the rakes to rake the hay across the path of the machine and leave it in the form of a continuous windrow at the side of the machine.

Having thus described my invention, what I claim as new, and desire to secure by Letters Patent, is as follows, to wit:

1. In a side-delivery horse hay-rake, the combination of the main frame, guides K and L, endless sprocket-chains $R'$, rakes R $H'$, having the arms V X, sprocket-wheels $r'$ $r'$ Z Z, guide-rails G $G'$, cross-bars $A'$ and $B^6$, curved guide T, braces O $O'$ $O^3$ $S'$ $S^2$ $S^3$, guide-bars $S^5$, and the means described for driving said chains and rakes and for vertically adjusting the main frame, substantially as and for the purpose set forth.

2. In a horse hay-rake, in combination with the main frames and the rakes, the guard-board $D^9$, arranged across the path of the machine immediately in the rear of the rakes, substantially as and for the purposes set forth.

HORACE McPHERSON.

Witnesses:
THOS. H. HUTCHINS,
GEORGE NIVENS.